United States Patent [19]

Constantine

[11] 3,917,249

[45] Nov. 4, 1975

[54] WORKPIECE ORIENTATION COLUMN

[75] Inventor: Henry G. Constantine, New Orleans, La.

[73] Assignee: Avondale Shipyards, Inc., Avondale, La.

[22] Filed: Aug. 20, 1973

[21] Appl. No.: 389,446

Related U.S. Application Data

[63] Continuation-in-part of Ser. No. 152,816, June 14, 1971, abandoned.

[52] U.S. Cl. ................................ 269/58; 269/71
[51] Int. Cl.² ..................................... B23Q 3/04
[58] Field of Search ............ 269/58, 60, 61, 63, 71, 269/73

[56] References Cited
UNITED STATES PATENTS

| | | | |
|---|---|---|---|
| 1,364,266 | 1/1921 | Fletcher | 269/58 |
| 1,414,970 | 5/1922 | Nelson | 269/60 |
| 2,015,357 | 9/1935 | Weaver | 269/58 |
| 2,469,644 | 5/1949 | Harrison | 269/71 |
| 2,783,531 | 3/1957 | Eisler | 269/71 |
| 2,835,964 | 5/1958 | Yarwood | 269/61 |
| 2,939,367 | 6/1960 | Thomas | 269/58 |
| 3,764,126 | 10/1973 | Arenas | 269/60 |

*Primary Examiner*—Roy Lake
*Assistant Examiner*—Mark S. Bicks
*Attorney, Agent, or Firm*—Robert S. Bramson, Esquire; James A. Drobile, Esquire

[57] ABSTRACT

A vertical orientation column capable of orienting or positioning a large workpiece, such as a marine propeller, with respect to four or five axes and a process for machining large and complex workpieces. The column is so constructed as to allow quick installation and removal of the workpiece and to position the workpiece in close proximity to the particular tool which is operating on the workpiece. The orientation column of the present invention is advantageously employed in the machining of propeller blade surfaces and the column is compatible with automatically controlled tools, such as machine tools operated by numerical control. In addition, the orientation column itself may be operated by numerical control. A process for rigidly mounting and moving a large workpiece to be machined for machining of complex shapes therefrom.

17 Claims, 22 Drawing Figures

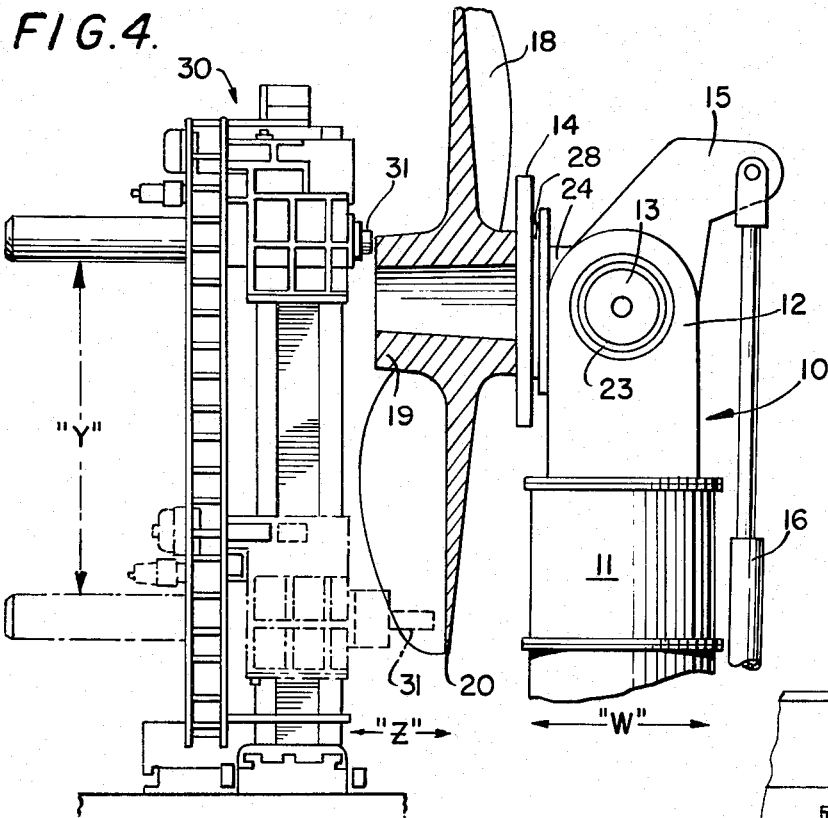
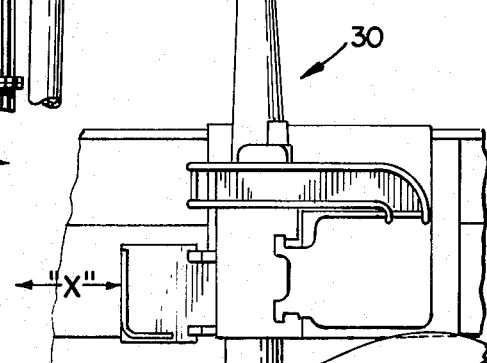
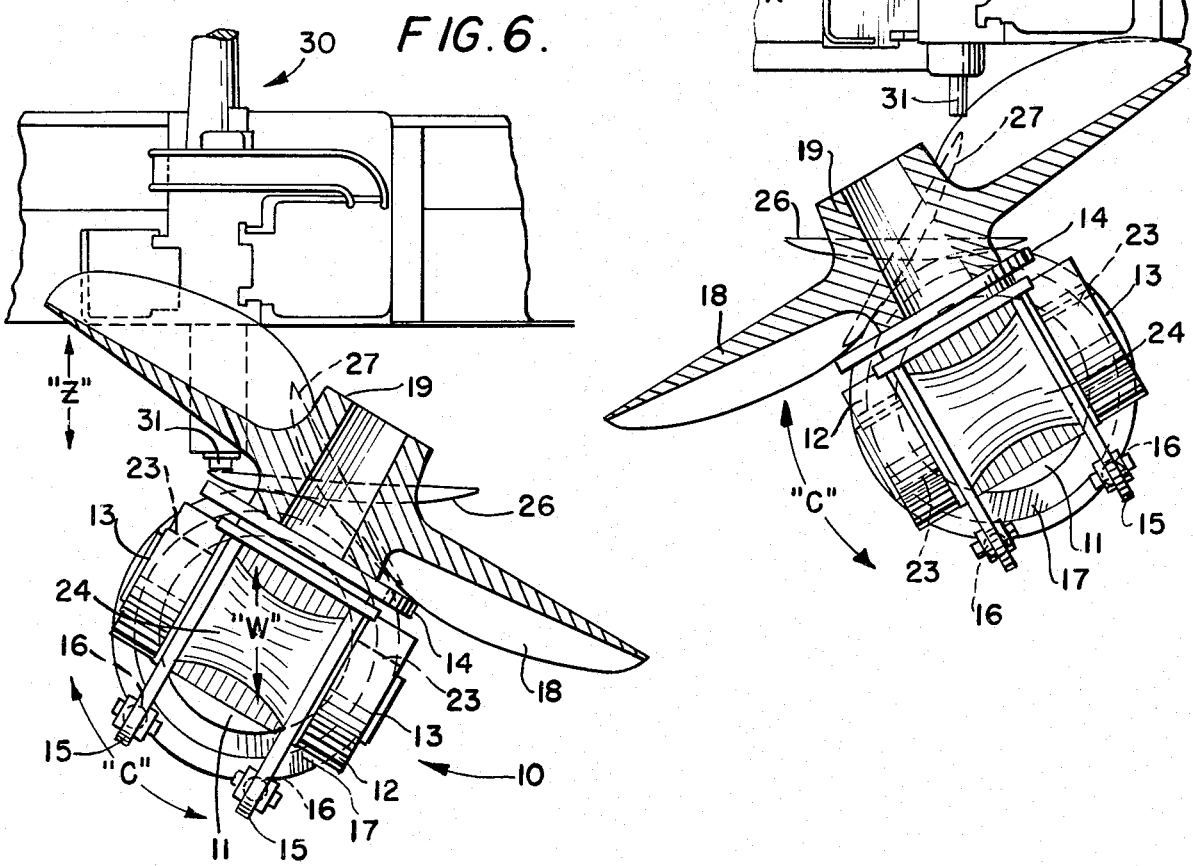

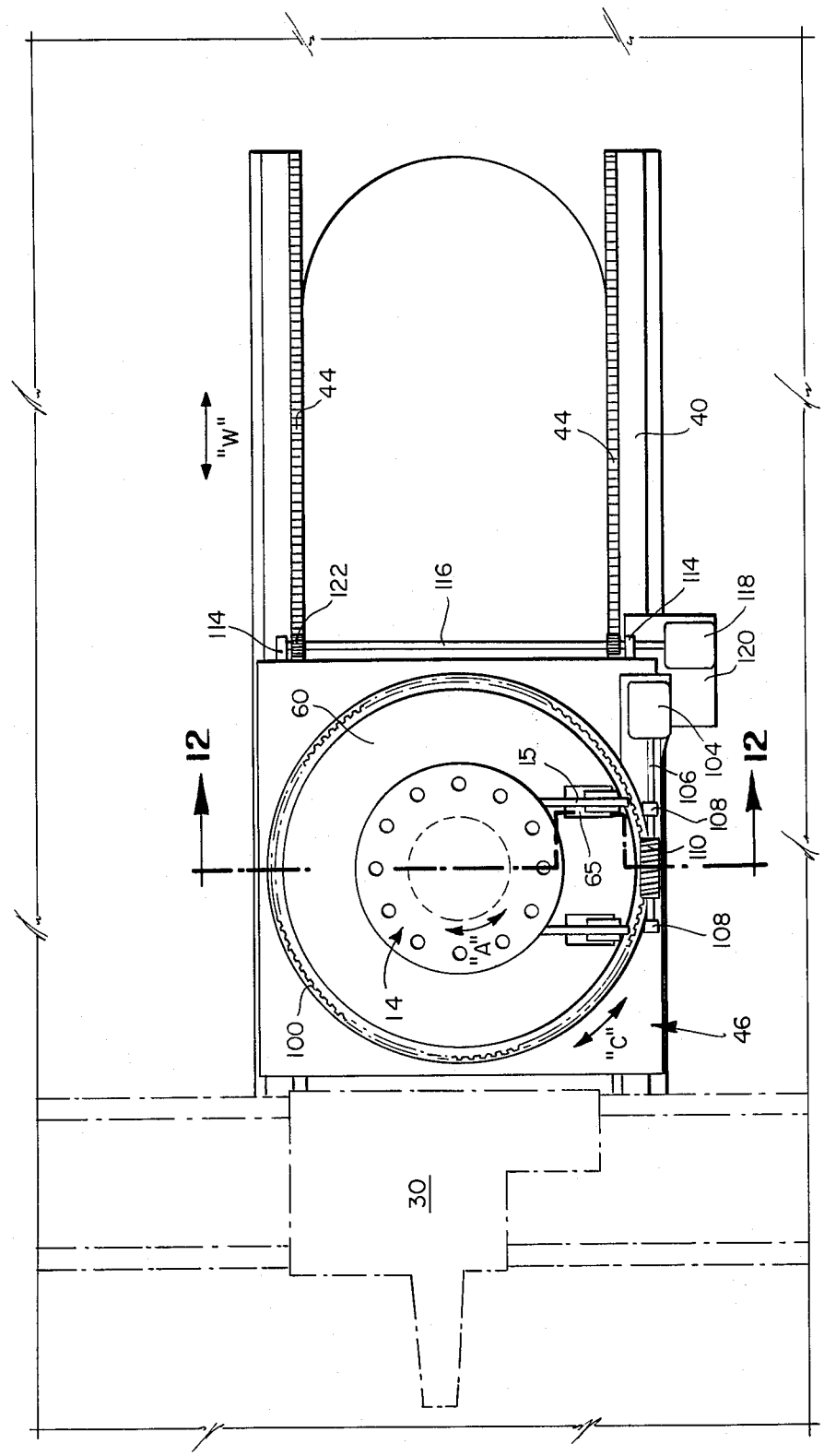

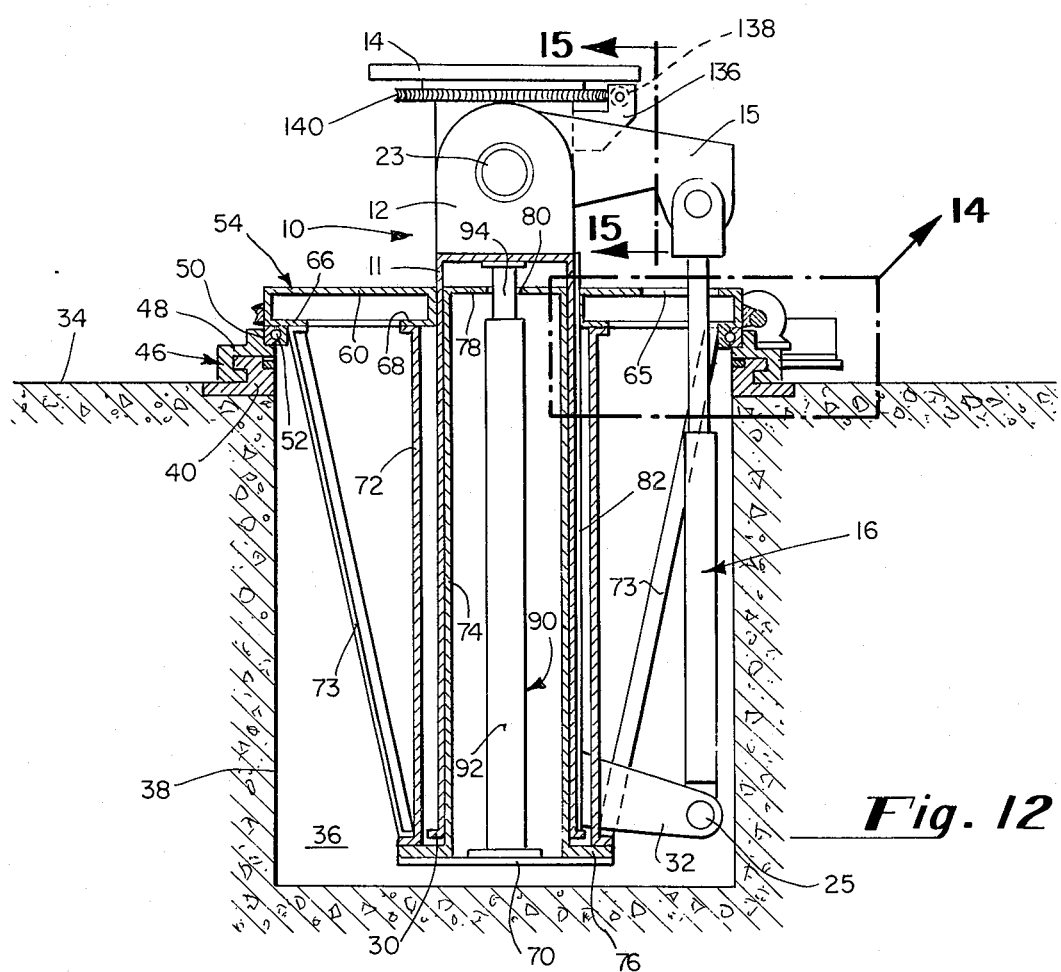
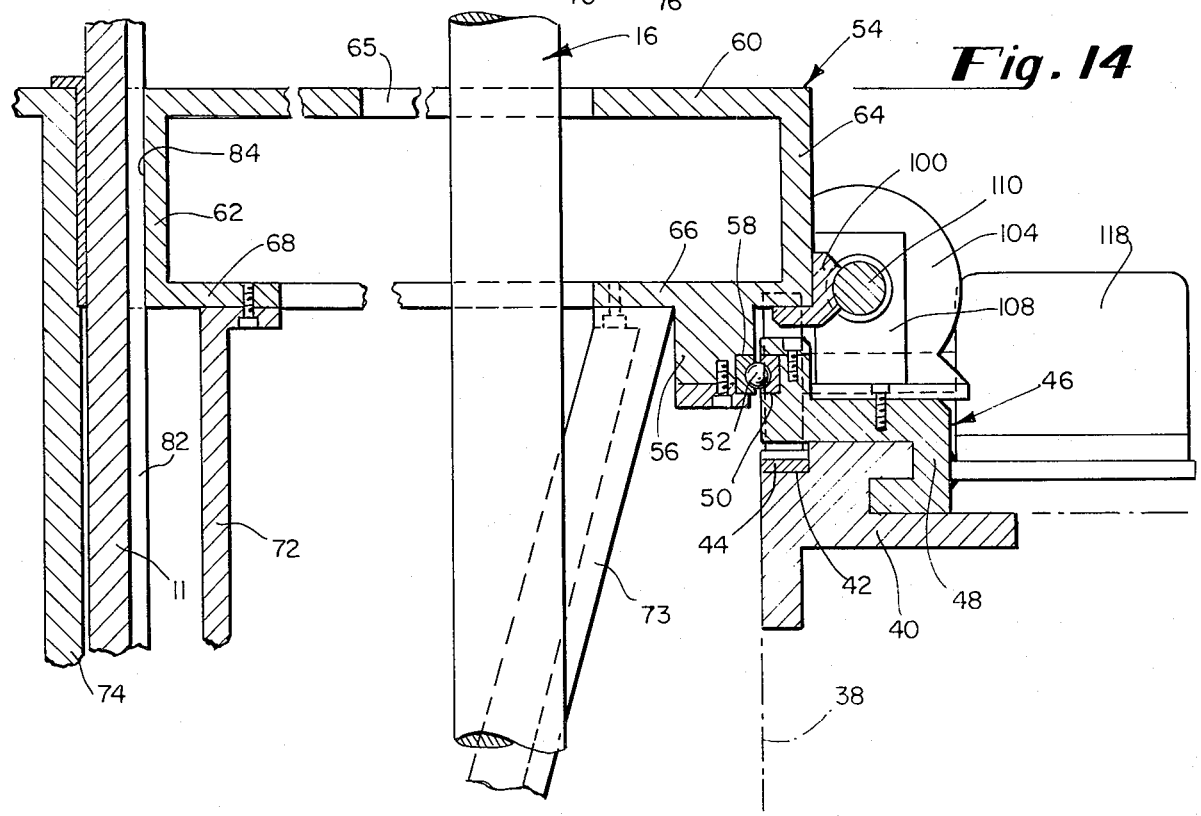

WORKPIECE ORIENTATION COLUMN

REFERENCE TO RELATED CASE

This is a continuation-in-part of U.S. patent application Ser. No. 152,816, filed on June 14, 1971, now abandoned.

BACKGROUND OF THE INVENTION

1. Field of the Invention

This invention is directed to a work support means and process, for supporting and positioning a large workpiece for machining of the workpiece to complex shapes, such as by the use of a numerically controlled horizontal boring mill.

2. State of the Art

In the art of machining marine propellers of large size, up to 30 or more feet in diameter and weighing 80 tons or more, it is necessary to machine each propeller to precise dimensions in geometrically complex forms.

One way of machining large propellers, used commonly in the United States, is to cast a propeller in the general outline of its final form, using a hand made wood pattern for the casting form, to clean the casting, and to do the final finishing of the propeller by hand, using hand-operated machines, such as grinders, chipping tools, and the like. This is an extremely time-consuming and expensive operation, and the machining of a large propeller can often take as much as 4,000 man-hours to accomplish.

There are machines commercially available for the purpose of machining propellers, but these have very substantial shortcomings. One such machine is a specialized propeller milling machine which has a cost of approximately 1½ million dollars, and utilizes a revolving table and revolving and rotating spindles to do the machining. However, this expensive machine does not produce an accurate surface finish in the final workpiece, and thus requires considerable hand finishing, does not efficiently utilize the available horse power because of the angle of orientation of its spindle, and is incapable of machining many parts of the propeller blade, such as the hub, fillets and blade outline.

Another commercially available boring machine which has nine axes of movement, uses two rotatable spindles with movable joints to machine the individual blades of variable pitch propellers. However, these machines are not capable of machining the propellers of a single unit blade, and are therefore only capable of being utilized in connection with a relatively small proportion of the marine propellers which are manufactured. Also, the use in this machine of movable joints results in a substantial loss of machine rigidity, reduces the ability of the machine to transmit power efficiently, and consequently results in a very inefficient use of machine power, reducing machining rates and increasing manufacturing costs. This machine is also extremely expensive, costing on the order of 2 million dollars.

Both of the foregoing commercially available machines are also limited in that they are primarily adapted for use in machining propeller blades. Therefore, if either machine is not being utilized for machining propeller blades, it is not readily adaptable for other general machining purposes, such as might be found in a conventional machine shop. This limited utility therefore substantially increases the expense of operating these machines, by reducing their efficiency, because of increased non-productive down time.

In the machining of large propellers and similar objects by a horizontal boring mill, it is necessary rigidly to support the workpiece, in order to prevent workpiece chatter or movement under the substantial forces of the boring mill spindle, which could produce an imperfect work surface requiring substantial hand finishing. In the prior art processes, the workpiece is rigidly supported by a substantial number of mounting blocks, built up under each propeller blade and to which the propeller blade is fastened by the use of finger clamps. These finger clamps, to be effective, must overlie the surface being machined and therefore interfere with the uninterrupted machining of the entire surface. This necessitates the movement of the finger clamps, at least once and often more than once, during the machining of each propeller blade. This is obviously time-consuming and therefore inefficient.

BRIEF SUMMARY OF THE INVENTION

The instant invention overcomes the foregoing deficiencies of the prior art, by providing a workpiece orientation column and process for orienting and positioning a large workpiece, having dimensions of up to 30 feet in diameter, and weights of up to 80 or more tons, with respect to up to five axes of movement and without contacting the work surface for the rigid mounting of the workpiece. The orientation column is designed for utilization in connection with commercially available large scale horizontal boring mills, and particularly those which are operable by numerical control. By mounting the workpiece with respect to the boring mill spindle, so that the workpiece can be moved with respect to up to five axes, while a conventional horizontal boring mill provides additional movement with respect to three axes, very fine adjustments of the relative location of the boring mill spindle and the workpiece can be achieved, in order to be able to achieve precise machining of the workpiece.

The orientation column comprises a vertical column, which is itself mounted for horizontal movement, along a track, toward and away from the boring mill spindle. The column is capable of being rotated about its vertical axis. The column is also provided with suitable means, such as a hydraulic piston and cylinder, for elevating and lowering the workpiece supporting face of the column. The workpiece supporting face is itself mounted for rotation from a horizontal position through 90° of rotation to a vertical position and is capable of being rotated through 360° of motion about an axis perpendicular to the supporting face.

In the horizontal position of the work-supporting face, the workpiece may easily be loaded onto and removed from the supporting face, such as from an overhead crane, to facilitate mounting and removal. The workpiece can then be moved, by rotation of the supporting face about a horizontal axis, toward a vertical position, in order to allow the workpiece to be machined by the horizontal boring spindle of a horizontal boring mill. The workpiece supporting face is also rotatable about an axis perpendicular thereto, which axis may be horizontal, vertical, or in an intermediate position, depending upon the particular position of the supporting face, in order to give an added dimension of rotational movement to the workpiece itself.

Accordingly, the invention comprises a workpiece orienting column, capable of moving toward and away from the boring mill or other machine utilized to operate on the workpiece, capable of being elevated and lowered with respect to the milling cutter on the spindle of such machine, capable of rotating about its vertical axis, capable of having the workpiece-supporting face rotated from a horizontal position through approximately 90° of movement to a vertical position, and capable of rotating the workpiece through 360° of movement, in a horizontal or vertical position of the work-supporting face or when the supporting face is in any intermediate position.

The process of machining a large complex workpiece by the use of such an orientation column includes the rigid mounting of the workpiece for machining without contacting the surface being finished. This rigid mounting is achieved by the use of mounting pieces supporting the face of the workpiece opposite the face being machined and fastening the workpiece to the mounting pieces with a suitable high strength thermoplastic adhesive, such as certain epoxy resins.

The five types of movements of the orientation column may be achieved by manual control of suitable drive motors and hydraulic systems for moving the orientation column and the workpiece. The movement and positioning of the orientation column about all five axes may, if desired, be controlled completely by a numerical control mechanism, in order automatically to move the workpiece in a pre-programmed manner. By the utilization of numerical control to operate the orientation column and the use of numerical control to operate the boring head of the horizontal boring mill, completely automated machining of large workpieces, such as marine propellers, having diameters of up to thirty feet or more and weights of up to eighty tons or more, can be achieved in a fraction of the time required for hand machining, with relative convenience and simplicity and within tolerances of at least plus or minus 0.005 inches.

The mounting of the orientation column to be movable along a long horizontal track, toward and away from the boring spindle of the boring mill, enables the orientation column to be moved a substantial distance from the boring mill. This feature allows the boring mill to be used for other purposes, either when the propeller is being loaded onto or unloaded from the orientation column, or when the boring mill is to be used for machining workpieces not requiring use of the orientation column.

The orientation column of the invention is relatively inexpensive to produce, currently costing in the range of about $200,000 to $400,000 to manufacture, and may be used in connection with a conventional horizontal boring mill currently having a cost of approximately $500,000. Therefore, for substantially less than one million dollars, a highly accurate assembly is provided, capable of machining propellers with more accuracy and speed and with greater versatility than has heretofore been possible, and also capable of being used for machining many types of workpieces other than propellers, such as main condensors, steering engines, rudders, struts, stern frames, and the like.

It is to be noted that, although the orientation column and process of this invention are intended principally for use for the machining of marine propellers, they may also be utilized for the machining of other large, complex objects of metal or other machinable materials involving unusual shapes, such as sonar domes, machined air foils, or any other object requiring precise positioning to any position or angle which are beyond the capabilities of conventional boring mills without the use of this invention.

Another advantage of the machine and process of the instant invention is that, in combination with a boring mill having three axes of movement, they allow a propeller to be machined from a solid cube of metal, rather than requiring a casting of the propeller to be produced first. Thus, it has been demonstrated that a marine propeller can be machined from a conventional rectangular block of metal, by utilizing the principles of this invention.

This invention also includes a process for efficiently machining complex geometrical shapes of large workpieces, having dimensions of at least about eight feet and weights of at least about 5 tons, by utilizing a machine having three directions of movement, along a vertical and two perpendicular horizontal axes, and by mounting the workpiece on a support in a manner providing at least four directions of movement of the workpiece, and by rigidly mounting the workpiece being machined without interfering with the surfaces being machined, whereby accurate machining of the workpiece can be achieved.

By utilization of the apparatus and process of this invention, propellers can be machined within tolerances of at least plus or minus five thousandths of an inch. These results are achieved, in the instance of a large marine propeller, at a cost of approximately ten percent of the cost of machining a marine propeller utilizing conventional manual techniques, and with much greater accuracy and speed than is possible utilizing the other available techniques.

The apparatus and process of the instant invention allow the use of the rigidly supported milling spindle of a horizontal boring mill and its positioning substantially at all times in perpendicular relationship to the surface being machined, in order to obtain maximum utilization of the horsepower of the boring mill, the maximum rate and accuracy of removal of metal from the propeller or other object being machined, and to minimize surface irregularities which require hand finishing.

The process and apparatus of this invention also allow the machining of certain shapes and areas of objects which were not hitherto capable of being done by the available prior art machines, such as by allowing the fillets and hub of a marine propeller to be machined, presenting the capability of cutting a keyway in the propeller hub, and even to taper the keyway, if desired. Therefore, the process and apparatus of this invention provide substantially greater versatility of use than has heretofore been available.

Accordingly, the orientation column and process of the instant invention combine the economic advantages of initial low purchase cost and minimization of unprofitable down time of the boring mill or other machining apparatus, together with the other advantages of increased versatility, increased efficiency and accuracy of operation, and the capability of machining a marine propeller or other workpiece from a shaped casting or solid block of metal.

OBJECTS OF THE INVENTION

It is therefore an object of this invention to expand the capabilities of a numerically controlled horizontal boring mill from three axis, full contouring capability, to an eight axis installation, by the introduction of an additional five axis orientation column.

Another object of the invention is to combine five movements in a single machine unit, and provide a means for positioning and precisely indexing a heavy workpiece, under exacting control, by increments of orientations, in conjunction with another machine's positions and operations.

A further object of this invention is to machine a large workpiece to precise dimensions, with greater accuracy, to unusual shapes of complex geometric configuration, containing compound curves and contours, by use of an auxiliary unit in conjunction with a general purpose numerically controlled horizontal boring mill.

Still another object of this invention is to reduce the cost, and improve the accuracy, of large marine propellers by machining them without the expensive capital outlay of a special single purpose machine.

It is a further object of the invention to provide an orientation column for use in the machining of large workpieces having complex shapes to be machined, and capable of positioning the workpieces with respect to at least four axes.

Yet another object of this invention is to provide a process for machining large, complex shaped workpieces, whereby the workpiece is mounted in a manner which allows it to be moved about five axes and with respect to a machining spindle which is movable about three axes.

Still another object of this invention is to provide an apparatus for machining marine propellers by providing an orientation column which is relatively inexpensive to manufacture, and which produces machined objects with much greater accuracy and of greater complexity and at a lower cost than has hitherto been possible.

A further object of this invention is to provide an apparatus and process for machining complex, large machinable objects, such as marine propellers, which may be utilized in connection with a conventional, three dimensionally movable spindle horizontal boring mill, in order to minimize the initial cost of the combined assembly and yet to have a machine which may be utilized for general purpose work when not used for machining complex forms, such as propellers.

Still another object of this invention is to provide an orientation column for large metal objects, such as marine propellers, which may be moved in such a manner that complex shapes may be machined while positioning the work to be at a substantially perpendicular angle, at all times, with respect to a rigidly supported conventional milling spindle, thereby allowing maximum efficiency of power transmission, maximum rate of machining and material removal, and maximum accuracy of machining.

A concomitant object of this invention is to provide a process for efficiently machining large, complex shaped workpieces by rigidly mounting the workpiece without obstructing the surface being machined.

DESCRIPTION OF THE DRAWINGS

FIG. 4 is a side elevational view partly in cross-section of the apparatus shown in FIG. 1 with the propeller positioned vertically in close proximately to a horizontal boring mill;

FIG. 5 is a plan view partly in cross-section of the apparatus shown in FIG. 1 with a right-hand propeller rotated at an angle to the center line between the apparatus of FIG. 1 and a horizonatal boring mill such that the lower blade is essentially parallel to the horizontal X axis in which the boring mill operates;

FIG. 6 is a plan view partly in cross-section of an arrangement similar to that shown in FIG. 5 except that a lefthand propeller is shown and the propeller has been rotated in the opposite direction from the center line;

FIG. 11 is a top plan view, of apparatus similar to that shown in FIG. 1, but, including other features of the invention, not specifically illustrated in FIG. 1;

FIG. 12 is a cross-sectional view, taken along 11—11 of FIG. 11;

FIG. 14 is an enlarged view of the section designated by numeral 14 in FIG. 12;

DETAILED DESCRIPTION OF THE INVENTION

Figure 7:
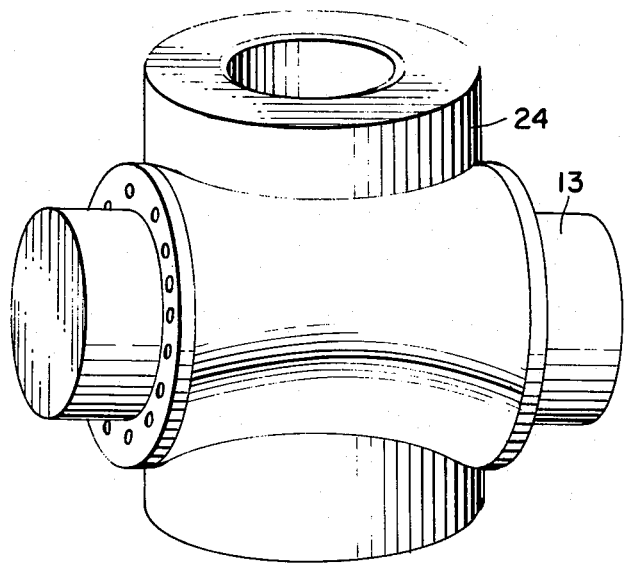
FIGS. 7, 8, 9 and 10 are perspective views of portions of the apparatus shown in FIG. 1.
Figure 8:
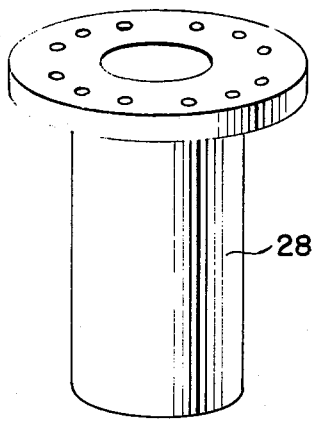

In the illustrated embodiment of the present invention as shown in FIGS. 1 through 6, apparatus 10 is provided for orienting or positioning a propeller or other large workpiece in order to machine the surfaces of the propeller or other workpiece. The apparatus 10 includes a vertical support column 11 having a U-shaped upper portion 12, a horizontal trunnion member 13, the ends of which are mounted in bearings 23 within each arm of the U-shaped portion 12 and a spindle housing 24 mounted on the trunnion member 13 for rotation about the axis of member 13. The trunnion member 13 and mounted spindle housing 24 are also shown in FIG. 7. The trunnion member 13 and mounted spindle housing 24 are connected so that the trunnion member and housing rotate together about the horizontal axis of the trunnion member. A spindle 28 is rotatably secured in bearings within the spindle housing 24 by suitable securing means such as, for example, a flange. The spindle 28 is shown separately at FIG. 8.

Figure 9:
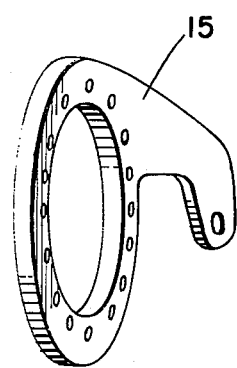

Attached to the outer portion of the spindle 28 is a face plate 14 for mounting of a marine propeller or other workpiece. A pair of lever arm members 15 are mounted on the sides of the spindle housing 24, and a pair of hydraulic piston and cylinder assemblies 16 are connected by means such as clevis pins at one end to the lever arms 15 and at the other end to cleats 25 secured to the vertical column 11. As better seen in FIG. 12, each cleat 25 is connected to one of two horizontal arms 32, and the arms 32 are fastened, as by bolting, to vertical support column 11. A lever arm member 15 is shown separately in FIG. 9.

Figure 10:
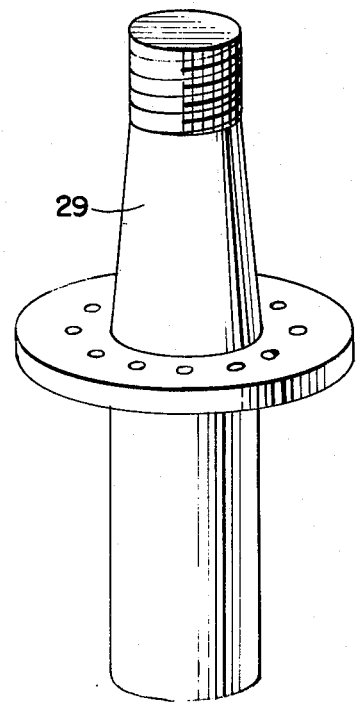

Nut and bolt means may be employed for attaching the face plate 14 to the spindle 28 as well as for mounting the lever arm members 15 on the spindle housing 24. A propeller 18 to be machined can be secured to the face plate 14 by suitable means, such as mandrels 29, shown in FIG. 10, or a conventional or hydraulic nut and bolt assembly.

Viewing FIG. 12, the vertical support column 11 is seen to comprise an elongated, hollow cylindrical column, which terminates at its upper end in the bifurcated arms 12 and at its lower end in flange member 30. Mounted, as by bolting, to the surface of the support column 11, are horizontally extending support arms 32, which are pivotally fastened to the lower end of the hydraulic cylinders 16, by means of the cleats 25. The support arms 32 are of such dimensions that, when the lever arm member 15, and the assembly fastened to it including the face plate 14, are in substantially the horizontal position shown in FIG. 12, the hydraulic cylinder and piston assembly 16 is substantially in the vertical position also shown in that drawing.

Viewing FIGS. 11 and 12, it will be seen that a deep, elongated pit is formed below the floor level 34 of the building in which the workpiece orientation column 10 is mounted. The pit is generally designated by numeral 36, and is approximately 22 feet deep, below the floor level 34, and has a runway length of approximately 25 feet.

Viewing FIGS. 11 and 12, it will be seen that there is mounted, at the opposite faces 38 of the pit 36, and located at the ground level 34, a sliding way surface 40, which is formed of cast iron, and has mounted in an indentation 42 formed in the inner and upper corners thereof, an elongated rack gear 44, which extends substantially along the entire length of member 40.

Mounted, in mating fashion with the member 40, is a "W" axis slide mounting table 46, of generally square configuration. Table 46 has depending therefrom in mating relationship with the way surfaces, a pair of depending, slotted side sections 48, best seen in FIGS. 12 and 14. The inner surfaces of sections 48 are provided with cut-out sections 50 in which bearing members 52 are mounted. The bearing members 52 are also mounted in corresponding cut-out sections 58 formed in the depending lips 56 of the rotating column support platform, which is generally designated by numeral 54, and having upper face 60.

As best seen in FIG. 14, support platform or rotating table 54 has inner depending face 62 and outer depending face 64. Outer face 64 has inwardly extending lip 66 formed integrally therewith and inner depending face 62 has outwardly extending lip 68 formed integrally therewith. The lips 66 and 68 are horizontally coplanar.

The rotating table 54 is slotted, with slot 65, to permit the piston of hydraulic cylinder assembly 16 to extend therethrough and is large enough to permit some horizontal movement of the cylinder as the lever arm member 15 is rotated from the horizontal to the vertical position.

Located above the bottom of the pit 36 is a bottom plate 70, on which there is fastened, as by bolting, a cylindrical outer structural supporting column or support member 72, which is also fastened, as by bolting, to the lower flange 76 of the cylindrical internal column guide member 74, and to the lower lip 68 of table 54. About six stiffener members 73 are fastened, as by bolting, to column 72 and lip 66. The internal column guide member 74 is hollow, has an upper, horizontal face 78 with an aperture 80 formed extending therethrough and at its lower face is formed with a depending flange 76 which is fastened to the plate 70. The supporting column 72 is incorporated in the device to stiffen and strengthen the orientation column structure and provide additional support for the very heavy loads being transmitted by the orientation column, because of the high weight of the workpieces and the column itself and the very substantial forces which are transmitted to the orientation column during machining of the workpiece.

The vertical support column is slidably mounted over the internal column guide 74, with the dimensional tolerance between the outer diameter of support column 74 and inner diameter of column 11 being approximately 0.004 inches. The vertical support column 11 is keyed for rotation with the table 54 by means of the key 82 rigidly connected to column 11 and the keyway 84 formed in table 54.

Mounted within the internal column guide 74 is a hydraulic piston and cylinder assembly 90 which comprises a hydraulic cylinder 92 and a hydraulic piston 94. The lower surface of the hydraulic cylinder 92 is suitably mounted to the support plate 70, as by bolting, and the upper surface of hydraulic piston rod 94 is suitably mounted to the adjacent surface of vertical support column 11, as by bolting. The piston rod 94 extends through the aperture 80 in the upper surface 78 of the column guide 74. Hydraulic cylinder is approximately 18 feet in height and 16 inches in diameter, and the piston rod is approximately 8 inches in diameter and 19 feet in length to allow a travel of the vertical support column of about 13 feet, and to provide adequate structural strength for the movement of the assembly.

As seen in FIGS. 12 and 14, mounted around the entire periphery of the rotating column support platform 54 at its lower outside corner, at the intersection of vertical face 64 and lip 66, is a worm 100, which is fastened to the support "W" axis slide platform column platform 54, is by suitable bolts, mounted in suitably tapped apertures in the table 54.

As best seen in FIG. 11, mounted upon "W" axis slide platform 46 is a suitable drive motor 104, which drives a drive shaft 106. Drive shaft 106 is rotatably journaled in suitable journal columns 108, also rigidly mounted on "W" axis slide platform 46. Lockingly mounted on shaft 106 is worm gear 110, which matingly and drivingly engages worm 100, and thereby can rotate the rotating column support platform 54 in the direction of axis C (as seen in FIG. 11). Drive motor 104, is preferably a silicon controlled rectifier-type of drive motor, having variable speed, torque, acceleration, draw and feed. The size of the worm and worm gear teeth and their pitch and material may be suitably determined, in a manner well known in the art, in order to achieve optimum efficiency for rotating the support table and associated apparatus, which could weigh as much as eighty tons, at a satisfactory speed, and with accurate position control. The drive motor 104, and drive motors 118 and 132 discussed below, are all preferably reversible, in order to permit movement of the orientation column in both directions along each axis of movement "A", "C" and "W".

Viewing FIG. 11, it is seen that there is rigidly mounted on the support platform 46 a pair of journal members 114, which rotatably mount a suitable shaft 116, which is rigidly connected to and rotatingly driven by a motor 118. Motor 118 is mounted on a platform 120, which is appropriately connected, as by bolting, to the "W" axis sliding platform 46. The shaft 116 mounts a pair of pinion gears 122 to engage the rack 44 for the purpose of permitting movement of the entire orientation column assembly in the "W" direction along the length of the racks 44. This movement allows the entire orientation column assembly 10 to be moved in pit 36 toward and away from the boring mill 30, in order to permit loading and unloading of the workpiece onto the orientation column and in order to permit utilization of the boring mill 30 for other purposes when the orientation column is not in use and to obtain the optimum proximity of orientation column to milling spindle for maintaining optimum position of the milling spindle to the work for maximum material removal rate with minimum chatter. The length of the pit 36 is approximately 25 feet, in order to provide optimum space for use of the boring mill 30 for other purposes than machining a propeller when the column 10 is in the remote position therefrom.

Figures 13, 15:
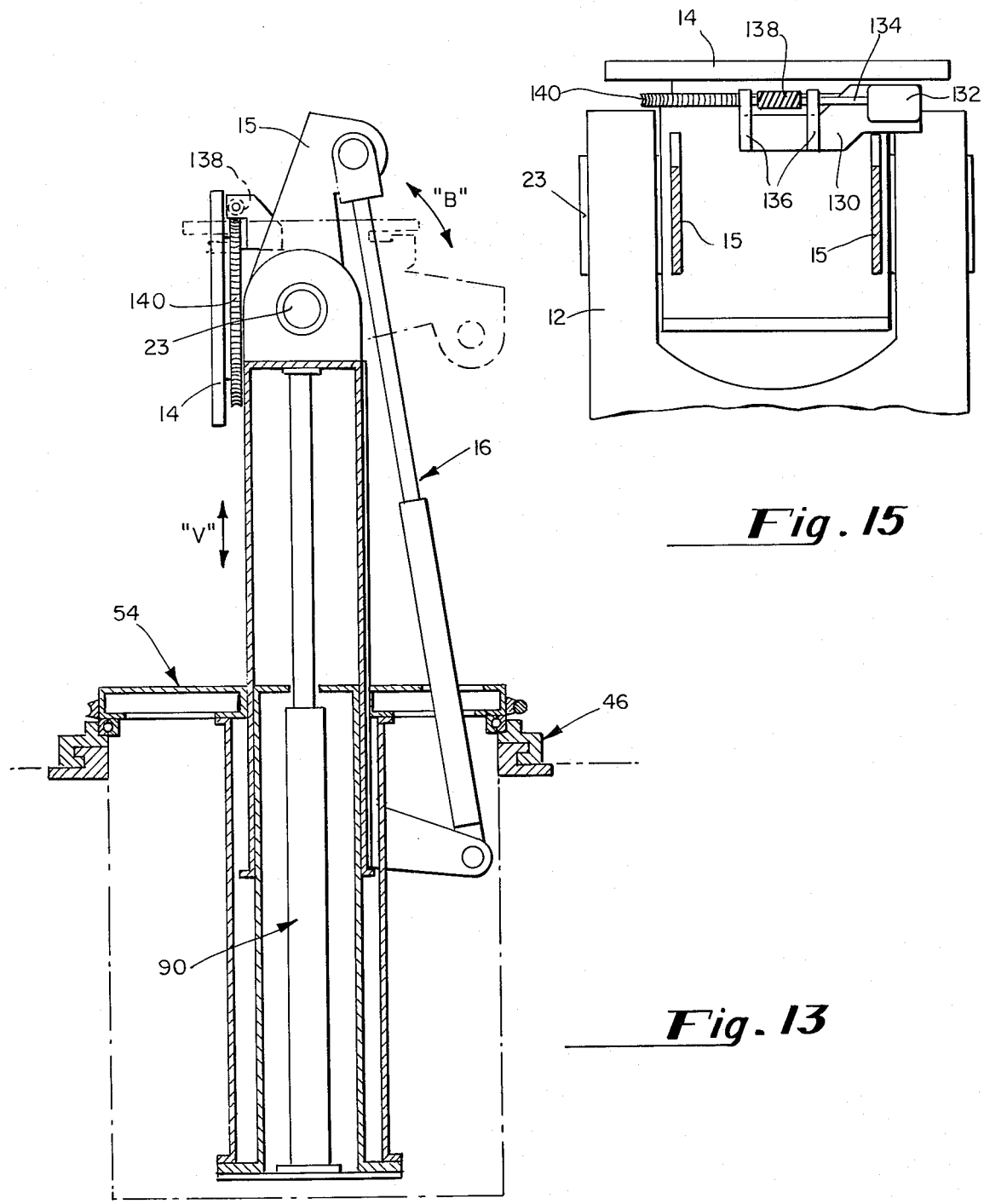
FIG. 13 is a cross-sectional view, similar to FIG. 12, with the column in the extended position and the propeller mounting face in a vertical position, with the horizontal position shown in phantom.
FIG. 15 is a cross-sectional view, taken along line 15—15 of FIG. 12.
Figure 16:
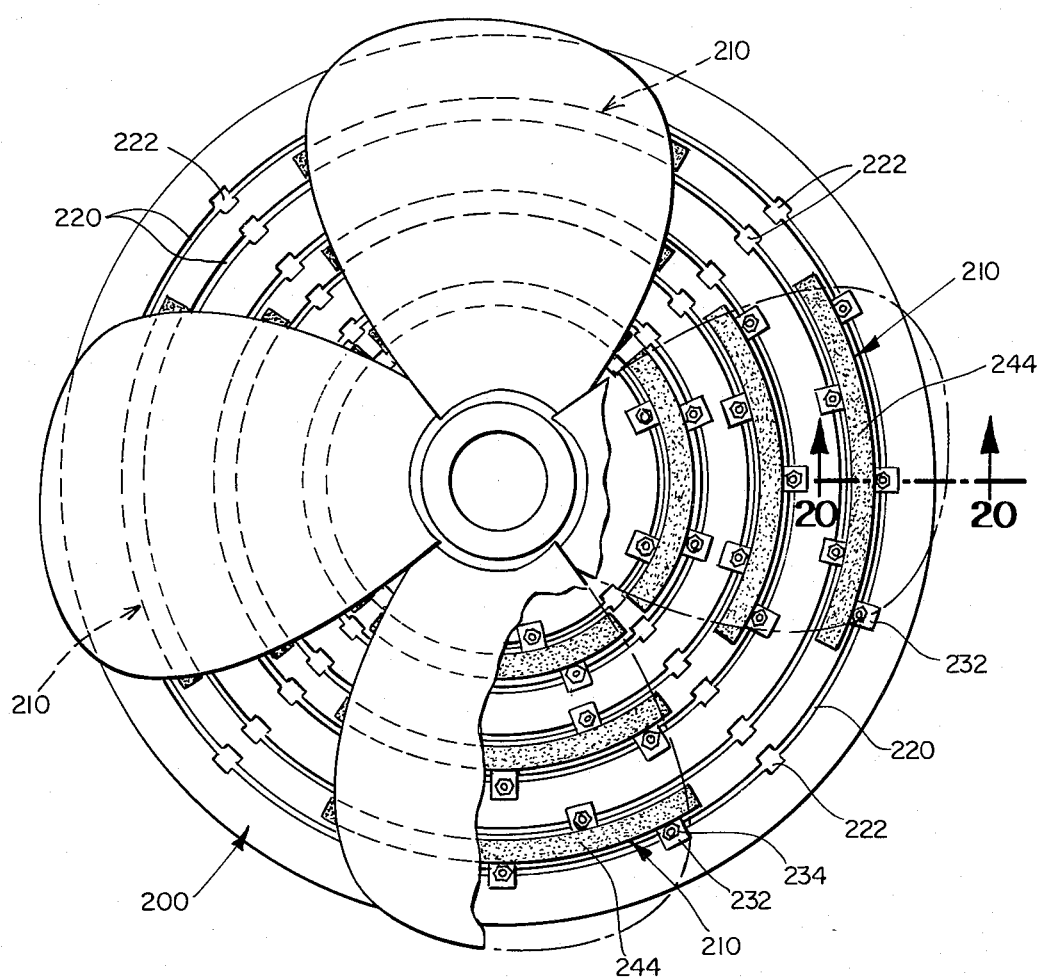
FIG. 16 is a partly fragmentary top plan view of a propeller blank mounted on a subplate in accordance with an aspect of this invention, mounted on the orientation column.
Figure 17:
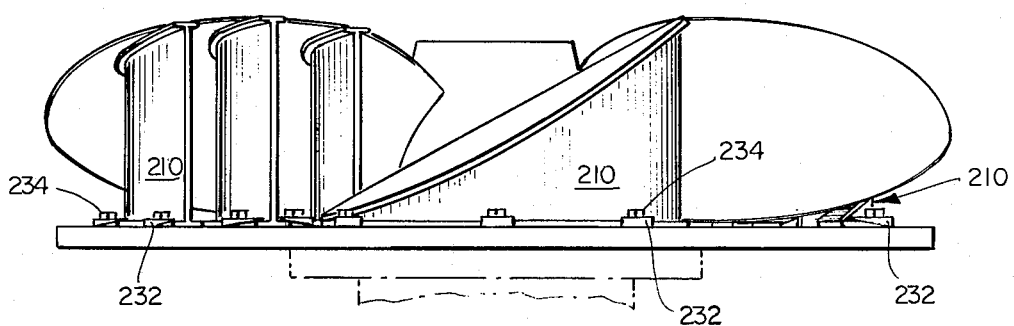
FIG. 17 is a side elevational view of the apparatus of FIG. 16.

Viewing FIG. 15, support member 130 is rigidly mounted, as by bolting, to the spindle housing 24. Mounted rigidly on support 130 is a variable speed silicon controlled rectifier type of drive motor 132, having a rotatable output shaft 134. Output shaft 134 is rotatably mounted in suitable journal members 136, which members 136 are secured to support member 130, for support and rotation thereof. Shaft 134 has rigidly fastened thereto worm gear 138. Worm gear 138 drivingly engages circular worm 140, which is rigidly connected about the entire periphery of spindle 28, to permit the spindle to be rotated, in the direction of the axis "A" through 360°, in either direction. The motor 132, is the same type of motor, in terms of general functionality and characteristics, as the motors 118 and 104, more fully described above. The material, pitch, size of gear teeth, and other parameters of the worm gear 138 and worm 140 may be suitably determined to satisfy the particular size of the unit in question, its desired speed and accuracy of operation, efficiency, and the like.

The general dimensions of the propeller orientation column of the instant invention, when utilized for handling marine propellers of up to 30 feet in diameter and 80 tons in weight is the following. The face plate 14 is approximately 8 feet in diameter, and larger size face plates may be utilized to adapt the column to handle larger workpieces, and vertical support column 11 is approximately 24 feet high and 6 feet in diameter. Table 54 is approximately 20 feet in diameter and pit 36 is approximately 22 feet deep and 25 feet long. The trackway provided by rack 44 is approximately 32 feet long.

The hydraulic characteristics of the hydraulic cylinder assemblies 16 and 90 are the following. Each is supplied with suitable hydraulic fluid, by 25 horsepower pumps providing pressures of up to about 2000 p.s.i. The rate of flow of hydraulic fluid into and out of hydraulic cylinders can be suitably controlled in a manner well known in the art, to provide for smooth and accurate incremental movement of the appropriate hydraulic pistons.

In operation, the propeller orientation column of the invention is preferably initially operated from the position along track 44 where the column 10 is most remote from boring mill 30. This is achieved by the operation of racks 44 and pinions 122 in response to drive motor 118. In the extreme remote loading position on the tract, the lever arm member 15 is in the position shown in FIG. 12, so that face plate 14 is located in a horizontal plane. A propeller or other suitable workpiece is then lowered, by a suitable crane or other loading mechanism, onto the upper surface of the face plate 14, and is mounted thereon, in the manner which is well known in the art, so that it is rigidly fastened to the face plate 14. The workpiece is then rotated from the mounting position shown in FIGS. 1 and 12 to a vertical position, such as shown in FIGS. 4 and 13, or to any intermediate position, for the commencement of the machining operation. This is achieved by the introduction of hydraulic fluid into hydraulic cylinder of the assembly 16, in order to rotate lever arm up to about 90° from the position of FIG. 12. With the workpiece in the position in which it is desired to be worked initially, the operation of SCR motor 118 is initiated to drive the propeller orientation column 10 toward the boring mill 30.

The boring mill 30 is of a conventional construction, such as the 50 FQ 3414 machine, manufactured by the Lucas Machine Division of the New Britain Machine Co., and is mounted on a suitable trackway for movement in the X direction, as shown in FIGS. 5 and 11. The operating boring head 31 of the boring mill 30 is also vertically moveable, as seen in FIG. 4, in the Y direction, and the boring spindle and milling sleeve may be extended and retracted in the Z direction by a suitable telescoping mounting of the square quill which rigidly supports the spindle 31, all of which is conventional in the art.

Accordingly, when the workpiece is proximate the boring mill 30, the final positioning of the workpiece may be achieved. Vertical movement of the column 10 by virtue of operation of hydraulic cylinder 90, will raise (or, if desired, to lower) the workpiece in the "V" direction. Rotational movement of the workpiece and the column about the vertical axis of the column 10, in the "C" direction, may be achieved by the operation of the motor 104 to drive worm gear 108 to engage the worm 100 which is rigidly mounted to the rotating column support platform 54. Further control of the position of the workpiece along the "A", "B", "C", "V" and "W" axes can be achieved by appropriae actuation of the drive mechanisms, described above, to achieve these movements. The available sizes and shapes of gear teeth and electric motor and hydraulic controls allow extremely precise incremental orientation of the orientation column to be achieved, by achieving controls which are accurate up to at least 0.005 inch. Additional control of the position of the boring mill head column and spindle can be achieved by using the three directions of movement of the boring mill 31 in the "X", "Y" and "Z" directions.

When the workpiece has been presented in the proper machining position, it is desirable to immobilize the workpiece, such as the propellers per se, in order to make them rigid, and in order to prevent chatter of the workpiece under the very substantial forces imposed by the operation of the boring spindle of the boring mill. Some means for rigidly supporting the workpiece are well known in the art of this invention. Such support of the workpiece prevents chatter of the workpiece and attendant imperfections in the surface thereof, and also enables the maximum transmission of power for metal removal from the boring spindle 31 to the workpiece.

In FIGS. 16 to 22 there is illustrated the preferred method of mounting the propeller blank on a subplate rigidly to support the propeller blades for machining without obstructing the surfaces to be machined. First, a circular subplate 200 is placed on the ground and the propeller blank is lowered thereon by a suitable overhead crane. The subplate diameter should be equal to or slightly less than the outside diameter of the propeller blank.

The propeller blank is temporarily mounted on the subplate by the use of temporary jacks and other support means, as necessary. Next, the tapered I-beam support members 210 are slid in position beneath each blade of the propeller beneath the top face of the subplate and the lower face of the blade. Three or four support members 210 are used for each blade and they are each slid in across the blade width in spaced relationship along the radial axis of each blade. The support members 210 are stopped when the inclined upper surface thereof is spaced a few inches below the lower surface of the blade to permit application of adhesive, as described below.

Figure 21:
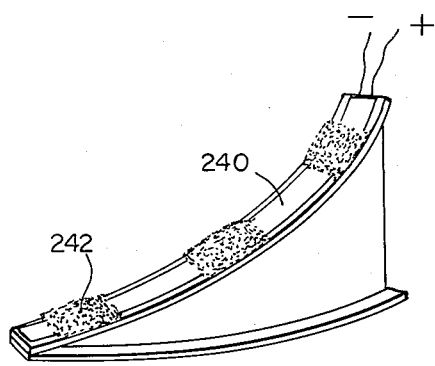
FIG. 21 is a perspective view of a support member illustrated in FIG. 17, with adhesive applied on its upper face in patches.
Figure 20:
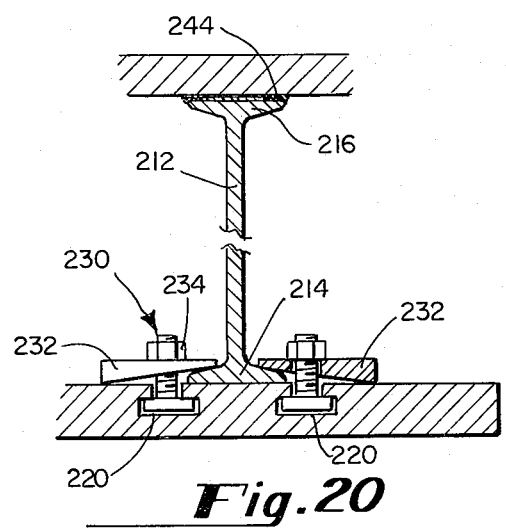
FIG. 20 is a cross-sectional view taken along line 20—20 of FIG. 16.

As best seen in FIGS. 20 and 21, each of the support members 210 is an inclined, curved I-beam fabricated of steel or iron and has a vertical web 212 about 1 inch thick. The horizontal base flange 214 is about 5 inches wide and 1⅜ inches high as is the inclined upper flange 216. The angle of incline of upper flange 216 is about 30°. The support member 210 is conveniently about 6 feet long, although support members of different lengths and angles of incline may be desired for use with different sizes of propeller blades.

Figure 18:
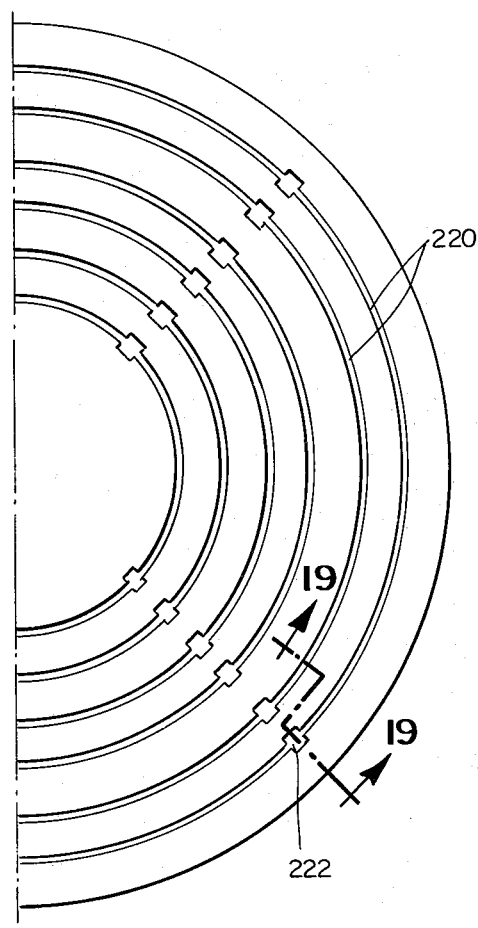
FIG. 18 is a fragmentary top plan view of the subplate illustrated in FIG. 16.
Figure 19:
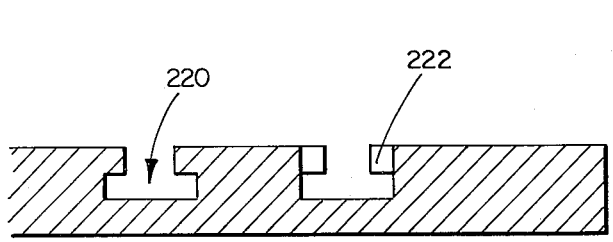
FIG. 19 is a cross-sectional view taken along line 19—19 of FIG. 18.

As seen in FIGS. 18 and 19, the subplate 200 is formed with several circular T-slot grooves 220 in which bolts 230 may be slid, the bolts being insertable and removable through enlarged apertures 222. When the support members 210 are located in their final support positions (after the adhesive has been applied) bolts 230 may be moved in T-slots 220 until a pair of bolt locking members 232 overlies the opposing edges of each support member flange 214 and is locked in place by tightening each nut 234.

Figure 22:
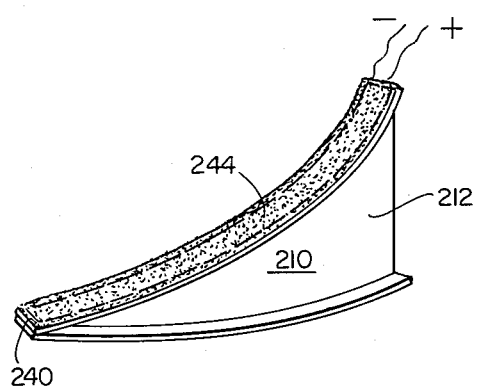
FIG. 22 is a view similar to FIG. 21, showing the adhesive applied in one continuous strip.

When the support members 210 are in position for the application of adhesive, one or more strip heater elements 240 are placed on the top of each support member. Uncured, relatively fast curing epoxy resin is then placed in spot applications or in a continuous application on the top 216 of the support member 210 with the strip heater immersed therein. The epoxy resin desirably is viscous, having the consistency of peanut butter, and may easily be applied with a suitablle trowel. In order to conserve epoxy, it is preferably applied in spots 242 as shown in FIG. 21, rather than continuously as shown in FIG. 22 and designated by numeral 244, and in a thickness of about one-half to three-quarters of an inch.

When the epoxy has been applied, the support member 210 is slid into final position so that each support member is touching the proximate underface of the propeller blade it is to support. In this position, the epoxy resin is well distributed, by contact, on the support member 210 and the contiguous underface of the propeller blade.

The epoxy resin or other similar quick-setting thermoplastic material, should desirably have a tensile strength of at least about 4,000 p.s.i. Of course, the particular tensile strength of the resin will depend on the size of the blade being supported and the surface area of adhesive application. One desirable resin for use is Devcon Plastic Steel, type A, which is a Bisphenol A type epoxy resin having a setting time of about three to four hours and a tensile strength of about 4,000 to 6,000 p.s.i. and including 80 percent of steel particles.

Once all of the support members 210 are firmly locked in place by bolts 230 and adhesive patches 242 or 244, depending on the mode of adhesive application, the temporary jacks and other riggings may be removed. The propeller blade is then rigidly fixed to the subplate by the adhesive 242 or 244, support members 210, and bolts 230.

The subplate assembly, with propeller affixed, is then raised, as by an overhead crane, and is lowered onto the mounting plate 14 of the orientation column 10, when it is in the position shown in FIG. 12. The orientation column 10 may then be utilized in the manner more fully described above to move and place the propeller blank for machining. If an extremely large propeller is being machined, it may also be desired to insert a mandrel, mounted to the subplate 200, through the propeller bore.

When machining has been completed and the propeller is to be removed from the subplate, one or two jackscrews (not shown), which may be from about 1¼ inches to about 1⅜ inches in diameter, and which may be located in appropriate tapped apertures in the upper web 216 of each support member, may be actuated when the subplate is in a horizontal position to separate the blade from the epoxy. The strip heaters must, however, first be activated to soften the "set" thermoplastic epoxy resin. The jackscrews may then be actuated to lift the blade slightly and break the bond between the resin and the blade. Of course, when the opposite surface of the blade is to be machined, the blade may be removed by the overhead crane, inverted and refastened to the subplate in the manner described above.

This process for mounting the propeller blank presents no obstructions on the propeller surface being machined and avoids the problems attendant upon the use of edge clamping techniques of the prior art, which require cessation of machining blades at least once per blade while the edge clamping means are moved to a non-obstructing position. The process of this invention described above rigidly supports the blade during machining against the forces created by the milling cutter on the blade. This process also is advantageous in that precisely shaped support members 210 are not required, since the amorphous resin readily adapts to irregularities of the adjacent propeller blade surface.

For propellers having diameters in excess of twelve feet, a modification of the above technique may be used, to avoid the use of the subplate 200. In this modification of the process, the propeller blades must extend substantially beyond to outside diameter of support plate 14. A large rectangular or square table (not shown) about 7 or 8 feet wide by 7 or 8 feet high and about 1½ inches thick, made of iron or steel, is bolted temporarily to the column 11 when it is in the elevated position of FIG. 13, so that the table is vertical and approximately coplanar with face plate 14. The propeller blank is placed directly on a hard, flat floor, in the same manner as it is placed on face plate 200, as discussed above. The support members 210 are placed under the blades, strip heaters imposed thereon and epoxy applied in the same manner as when a subplate is used. When the epoxy is set, the propeller is lifted from the floor and mounted on face plate 14 when the face plate is in the horizontal loading position. The propeller blade is fastened, such as by a mandrel inserted through its hub, to the face plate 14. The blade to be machined is then rotated to a vertical position by the action of hydraulic cylinders 16. It is important to note that the blades must extend substantially beyond the outside diameter of face plate 14, because all of the three or four support members per blade are fastened to the blade outboard the face plate. The blade to be machined is then rotated to the dependent, vertical position wherein the bottom flanges 214 of the support members 210 bear directly against the vertical table. The weight of the blade is considerable, on the order of 25 tons or more and much of that weight bears against the table, providing a sturdy support. When a blade has been machined the face plate 14 is raised slightly, so that the support members are spaced from the table. The face plate is then rotated 90° in the "A" axis direction to place the next blade in position for machining, and the face plate is rotated in the "B" direction until the support members bear against the table. When all blades have been machined on one side, the blade may be lowered to the floor, the strip heaters activated to soften the adhesive, the jackscrews actuated to break the adhesive bond, and the blade lifted off the support members. The blade may then be inverted and remounted, in the same fashion, for machining the opposing side of the propeller.

In the operation of the orientation column and process of this invention, it is extremely important to have the spindle of the boring mill or other cutting machine in substantially perpendicular relation to the surface of the workpiece being cut, in order always to minimize chatter, to permit maximum transmittal of power from the boring mill or other cutting machine to the workpiece and thereby to achieve the greatest efficiency, material removal rate and accuracy of cut. This positioning is achieved by suitable control of the appropriate actuating mechanism for moving the workpiece about one or more of the A, B, C, W and V axes, and by appropriate movement of the boring machine along the X, Y and Z axes. Because of the substantial variation of positions in which the workpiece is allowed to be placed, the boring spindle 31 of the boring mill 30 has access to machine otherwise inaccessible positions of the workpiece, such as the hub of the propeller, fillets, the leading and trailing edges of each blade, and the like.

It is particularly desirable to maintain the shortest distance possible between the horizontal boring mill 30 and the propeller blade, since the cutter 31 should be extended as little as possible in order to maintain its rigidity and thus assure a precise cutting operation. The orientation column apparatus 10 of the present invention can bring the propeller 18 into optimum position for machining of the propeller surfaces. As noted above, it is also particularly important to maintain the spindle of the boring mill in a substantially perpendicular relation to the surface being machined at all times, for optimum rate, efficiency and accuracy of material removal.

The lower blade of the propeller 18 is often machined first, and the machining operation is commenced by movement of the milling cutter 31 across the width of the blade. FIGS. 5 and 6 show the lower blade 26 and the upper blade 27 positions for right-hand and left-hand propellers, respectively, with the lower blade in position for machining by the horizontal boring mill 30. Often employed as the horizontal boring mill 30 is a three axis contour horizontal boring mill capable of simultaneous movement in the X, Y and Z axes and adapted for numerical control operation. Numerical control methods are described, for example, by Nils O. Olesten, *Numerical Control* (1970). The direction of movement of these three axes is three dimentional with the directions being mutually perpendicular, as shown in FIGS. 4, 5 and 6. Cuts may be taken following a predetermined radius of the propeller 18 with movement of the milling cutter 31 in three axes, thus maintaining the cutter path at a fixed distance from the center of the propeller hub 19. Alternatively, the Y axis may remain fixed and the cutter may proceed across the propeller blade with movement in the X and Z axes only. This latter method is often preferred except when close to the fillet where the blade meets the hub. Beginning at the outer tip 20 of the lower blade, cuts may be taken across the blade surface, either with successive cuts being made in opposite directions, e.g., left to right, then right to left, or by making all cuts in the same direction, a method which has been found to reduce cutter back drag on the propeller blade surface. Cuts may be made from the edges up to the thickest part of the blade. The milling cutter often employed for this operation is a face milling cutter having a diameter of about 12 inches.

In machining the surface of the propeller, it is advantageous to maintain a maximum amount of cutter face width in contact with the propeller blade surface in order to allow the milling cutter to operate at optimum efficiency in removing metal from the blade. By maintaining such contact between propeller surface and milling cutter, a maximum amount of material can be removed with each pass of the cutter across the surface. In addition, smooth and highly accurate surfaces are produced without the peaks and valleys which are characteristic of prior art equipment. In order to maintain this relationship between cutter face and blade surface the propeller 18 can be revolved with rotary motion C to an angle which varies depending on the distance of the milling cutter from the propeller hub 19. This capability of rotating the propeller with rotary motion C also serves as a means of avoiding cutter back drag and thus reducing the heat generated at the interface between the milling cutter and the propeller surface. The variation in the required angle of rotation off the centerline is due to the increase in the helix angle of the propeller blade as the hub 19 is approached from the blade tip 20. Thus, for example, the blade surface may be divided into three zones, with the end or tip zone being at a distance of 0.8 R to 1.0 R, the mid zone being at a distance of 0.8 R to 0.6 R and the hub zone being at a distance of 0.6 R to 0.3 R with R being the radius of the propeller 18 or the distance from the center of the hub to the outer tip of the blade. In the case of the machining of a four-bladed marine propeller having a diameter of about 23 feet, good results may be obtained, for example, by revolving the propeller 18 with rotary motion C to an angle of 22° 24′ while machining the portion of the pressure surface in the tip zone, the angle being measured with respect to the centerline between the column 11 and the horizontal boring mill 30. This angle of 22° 24′ is equivalent to the helix angle at 0.9 R, the average radius in the tip zone. In the mid zone, the propeller may be revolved to an angle of 28° 24′, the helix angle at 0.7 R, while in the hub zone the propeller may be revolved to the maximum angle permitted by the outreaching side blades, or about 32° to 35°. A deliberate variation of approximate 3° to 5° between "C" axis positioning and true helix angle will reduce cutter path steps.

When the milling cutter 31 has reached the propeller hub 19, machining of the pressure surface of one blade will have been completed. The outline of the blade may then be cut, employing a milling cutter such as a slabbing cutter having a diameter of about 6 inches. Before starting to cut the outline of the blade, the propeller 18 is preferably revolved with rotary motion C in order to position the outline surface in the proper relation to the "X" axis. The cutter 31 is then positioned at the center of the blade tip 20 and moved in the "X", "Y" and "Z" axes to trace the blade outline as it travels along the leading edge of the blade toward the hub 19. This action is repeated for the trailing edge, starting again at the center of the blade tip 20 and moving in the opposite direction toward the hub 19. Two cuts will usually be required for the blade edge, with one rough cut followed by a finish cut employing a milling cutter which is capable of machining to close tolerances. Manual override of the horizontal boring mill feed rates may be employed as necessary in the areas around the hub 19, as well as in areas where irregular casting occurs or where there is excessive metal.

The preceding machining operations are designed to complete the machine work with regad to the pressure face and blade outline of one blade. Upon completion of these steps, the milling cutter 31 is retracted in the "Z" axis and the column 11 moved in the "W" axis along its horizontal track to allow the propeller 18 to clear the horizontal boring mill 30 for rotation of the propeller blades to bring the next blade into position for the machining operation as shown in FIG. 4. The column 11 then returns along its track to a position in close proximity to the horizontal boring mill 30 and the cutting procedures are repeated to machine the pressure face and blade outline of the next blade. The foregoing procedure is repeated as often as is necessary to machine the pressure surface and blade outline of each blade of the propeller 18.

Upon completion of the pressure surfaces and blade outlines for each blade, the milling cutter 31 is withdrawn in the "Z" axis and the orientation column 11 is withdrawn in "W" axis and the propeller 18 is rotated with rotary motion C to a centerline position with helix angle of zero. The column 11 is then returned along the "W" axis to the cutting position, again bringing the propeller 18 as close as possible to the horizontal boring mill 30 in order to allow the milling cutter 31 to remain as rigid as possible, thus assuring a precise cutting operation. The cutter 31 is then allowed to trace the full circumference of the propeller hub 19 in the "X" and "Y" axes with cutter movement in the "Z" axis as necessary as the cutter approaches the trailing edge hub fillet where the blade joins the hub closest to the end of the hub. This operation results in the turning of the outer diameter of the hub 19. Movement of the cutter 31 in a circular path is discontinued upon reaching the propeller blade and a reciprocating cutter action is initiated with circular movement limited to the quadrant of the hub 19 between the blades. Cuts may be made moving alternatively left to right, then right to left, with movement in the "X" and "Y" axes and an intermediate movement in the "Z" axis during a short dwell period preceding a change in direction of rotation. This action is continued until maximum depth between blades is reached, as restricted by blade overlap. The preceding pattern is repeated in each space between adjoining blades. It is not necessary to rotate the propeller blades to accomplish this milling of the hub 19. As an alternate method, column may be revolved in "C" axis to bring the propeller blade fillet nearly parallel to the boring mill spindle. In this manner, the milling cutter can travel along a cutter path near the center of the blade fillet radius and reduce the time, while improving the quality of the fillet cut.

Figure 1:
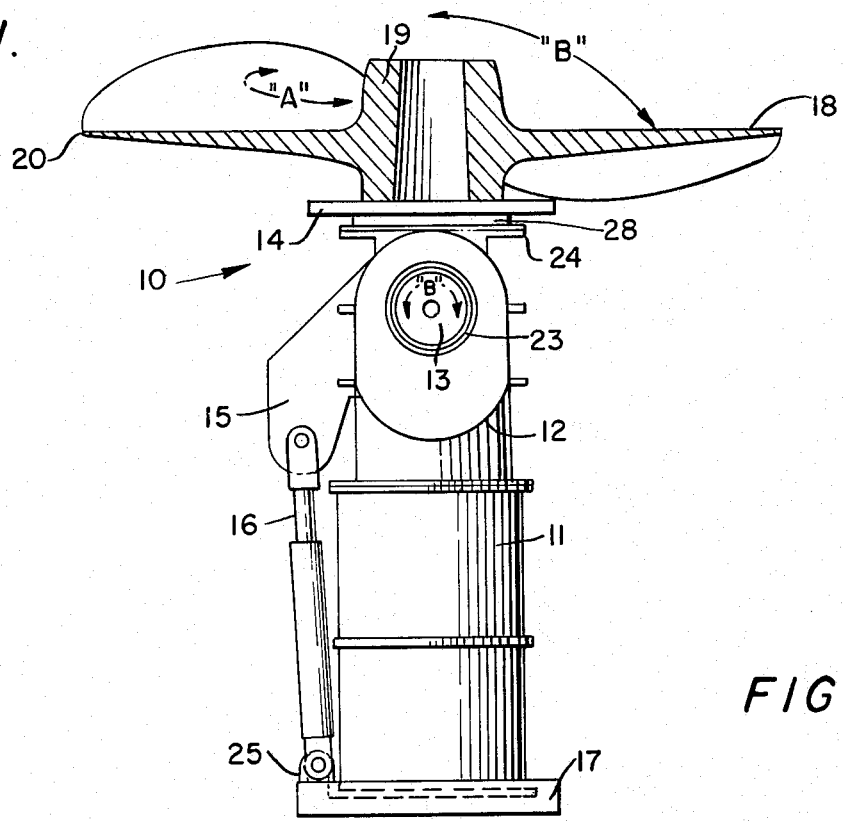
FIG. 1 is a side elevational view partly in cross-section of apparatus constructed according to the principles of the present invention showing the apparatus with a propeller to be machined horizontally disposed on the face plate of the apparatus.
Figure 2:
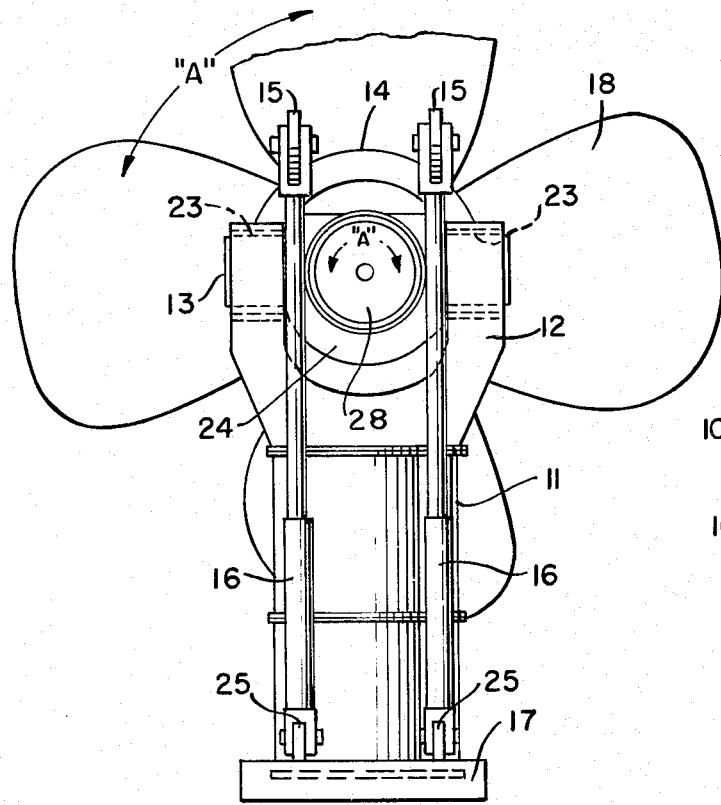
FIG. 2 is a rear elevational view of the apparatus shown in FIG. 1 with a propeller in the machining position.
Figure 3:
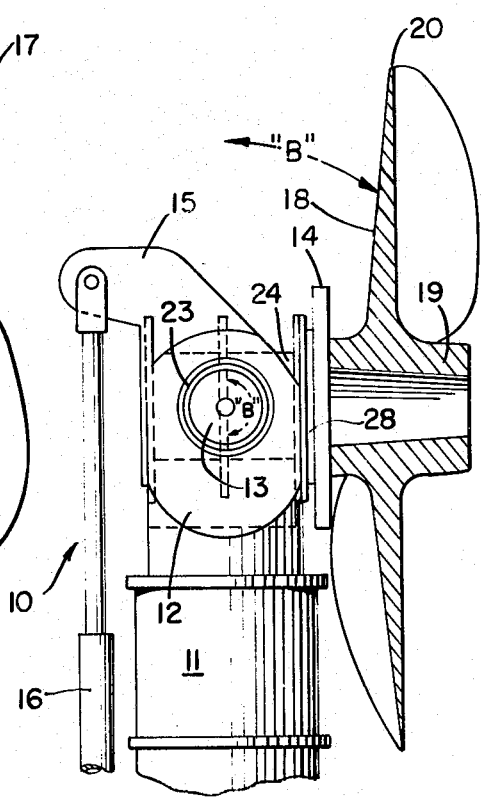
FIG. 3 is a side elevational view of the apparatus shown in FIG. 1, partly in cross-section, with a propeller to be machined vertically disposed on the apparatus.

With the machining of the hub 19 all machine work on the pressure face side of the propeller 18 is complete. The horizontal boring mill cutter 31 can be withdrawn in the "Z" axis while the orientation column apparatus 10 with mounted propeller 18 is withdrawn in the "W" axis. The lever arms 15 are then employed to restore the propeller 18 to the installation and removal position as shown in FIG. 1. In order to machine the opposite or suction side of the propeller 18, the propeller 18 can be removed from the face plate 14 and remounted with the suction side up. A repetition of the sequence of steps followed in machining the pressure face of the propeller 18 will result in the machining of the suction side.

With the machining of the suction side of the propeller 18, all machine work will have been completed, and only minor hand work will remain in order to produce a finished propeller. The propeller 18 can be returned to the position shown in FIG. 1 and removed from the face plate 14.

The cutting rate can be controlled by varying the feed rate in the "X" and "Y" directions of boring spindle 31 or by other adjustments of the workpiece with respect to the boring head 31.

Accurate positioning of the workpiece can be achieved manually by the utilization of manually operated controls, in a manner which is well known in the art, for the three electric motors and two hydraulic systems which provide the five axes of movement of the orientation column of this invention. Appropriate fine adjustment markings, such as vernier markings can be provided on the appropriate parts of the orientation column, such as on the vertical surface of the support platform at 64, with a proper zero marker on an adjacent, relatively stationary member, such as on the member 48, to provide a fine reading at all times of the precise position of the workpiece in order to allow accurate control of the position of the workpiece. If desired, the five motor and hydraulic controls can automatically be controlled by a suitable computer program, using numerical controlled equipment and techniques which are well known in the art.

The materials of manufacture of the orientation column apparatus 10 should be of steel and other similar materials of high strength and wear resistance. The bearings of the spindle housing 24 as well as the trunnion bearings are preferably manufactured from nodular iron casting bronze or similar materials in conjunction with appropriate bearing surface materials.

In the foregoing description of the invention, the preferred embodiment has been disclosed, utilizing particular hydraulic and electrical systems and types of gears. However, it will be appreciated that other well-known mechanisms and devices may be utilized to achieve the horizontal, vertical and rotational movements of the orientation column and face plate, without departing from the spirit and scope of the invention. For example, precision ball screws can be substituted for, or used in conjunction with, the hydraulic cylinder assemblies described above, to provide more accurate control of movement by the ball screws than is possible with a hydraulic system. Particular types of motors and hydraulic feeds, types and parameters of gear systems, and precise sizes, materials and shapes of individual members of the invention can be varied in accordance with the particular uses of each orientation being designed.

What is claimed is:

1. Apparatus for orienting and positioning a large, complex shaped workpiece for machining by movement with respect to five axes, comprising:
   a. At least one horizontally extending fixed track;
   b. Table means mounted on said track;
   c. First drive means drivingly interconnecting said table means and said track for back and forth movement of said table means;
   d. Platform means rotatably mounted on said table mekans and defining a vertically extending aperture therethrough;
   e. Second drive means rotatably interconnecting said table means and platform means;
   f. A vertically extending support column having a vertical axis and extending through said aperture;
   g. Means mounting said support column for rotation with said platform means;
   h. Elevating means rigidly mounted to and extending beneath said platform means and fastened to said column to raise and lower said support column with respect to said platform means;
   i. Housing means mounted on said support column above said platform means for rotation about an horizontal axis;
   j. Rotating means mounted on said support column and connected to said housing means to rotate said housing means about said horizontal axis between a horizontal and a vertical position;
   k. Workpiece table means mounted on said housing means for rotation thereon through about 360°; and
   l. Third drive means drivingly interconnecting said housing means and workpiece table means for rotation of said workpiece table means.

2. In an apparatus as set forth in claim 1:
   a. Guide means guiding the up and down movement of said support column and comprising a guide member concentric with and interior to said support column and of substantially the same shape as the support column;
   b. Stiffening member dependingly and rigidly mounted to said platform means;
   c. Connecting means rigidly interconnecting said stiffening member and said guide member; and
   d. Said elevating means interconnecting said connecting means and said support column.

3. Apparatus as set forth in claim 2, including two tracks, a base mounting said tracks and defining a deep aperture extending along the length of said tracks to accommodate said guide member.

4. Apparatus as set forth in claim 2, wherein said elevating means is an hydraulic piston and cylinder assembly.

5. In an apparatus as set forth in claim 1:
   a. Said support column terminating proximate its upper end in two vertically extending spaced arms;
   b. Said housing means including horizontally extending trunnion members rotatably mounted in said arms and an aperture which is coaxial with said column when said housing means is in one position; and
   c. Said workpiece table means comprising a flat circular table member and a depending spindle member rotatably mounted in said aperture in said housing means.

6. In an apparatus as set forth in claim 5:
   a. A pair of lever arms rigidly mounted to said housing means;
   b. Said rotating means comprising a pair of hydraulic piston and cylinder assemblies;
   c. One of said piston and cylinder of each assembly being rotatably connected to one of said lever arms;
   d. The other of said piston and cylinder of each assembly being fixedly and rotatably connected to said support column; and
   e. A pair of elongated apertures defined by said platform means through which said piston and cylinder assemblies extend.

7. In an apparatus as set forth in claim 5:
   a. Said workpiece table means having a worm extending about its periphery; and
   b. Said third drive means comprising a worm gear mounted on said housing means and rotatingly engaging said worm.

8. Apparatus as set forth in claim 2, wherein said platform, stiffening member and guide means mount and support said support column to withstand heavy loads up to at least about 100,000 pounds of a workpiece mounted on the workpiece table means.

9. Apparatus as set forth in claim 2, including a plurality of rigid bracing members interconnecting said platform means and said stiffening member.

10. In an apparatus as set forth in claim 2:
   a. Said support column being substantially cylindrical and having a vertically extending key;
   b. Said platform means aperture including a keyway in which said key fits whereby rotation of said table will rotate said support column independent of the position of elevation of the support column with respect to said platform means; and
   c. Said guide member being substantially cylindrical.

11. Apparatus for supporting and orienting a large workpiece such as a marine propeller having a diameter of at least about 8 feet and weighing at least about 5 tons for machining by a horizontal boring mill, comprising:
   a. A fixed horizontal trackway comprising a pair of tracks;
   b. A table mounted on said trackway;
   c. Platform means rotatably mounted on said table and defining a central non-circular aperture;

d. Means mounted on said table to propel said table back and forth along said trackway;
e. A vertical support column with a vertical axis and extending above and below said platform means and similar in shape to said non-circular aperture to be rotatable with the platform means and vertically movable with respect thereto;
f. First drive means drivingly interconnecting said table and platform means to rotate said support column about said axis;
g. Elevating means rigidly mounted to said support column and to said platform means and extending beneath said platform means vertically to raise and lower the support column;
h. Housing means mounted on said support column proximate the upper end thereof;
i. First mounting means on said support column mounting said housing means for rotation about a horizontal axis between a vertical and a horizontal position;
j. Rotating means connected to said housing means and said support column to rotate said housing means about said horizontal axis between a horizontal and a vertical position;
k. Workpiece table means to mount a workpiece and having a transverse axis;
l. Second mounting means rotatably mounting said workpiece table means on said housing means; and
m. Second drive means mounted drivingly interconnecting said housing means and said workpiece table means to rotate said workpiece table means about said transverse axis through about 360° of movement.

12. Apparatus as set forth in claim 11, wherein said support column is substantially cylindrical and is mounted between two concentric substantially cylindrical members, comprising an outer stiffening member and an inner guide member, the outer diameter of said guide member being slightly less than the inner diameter of said support column, means rigidly and dependingly mounting said outer stiffening member to said platform means, means rigidly mounting said guide member to said stiffening member, said elevating means being connected to at least one of said stiffening member and said guide member.

13. Apparatus as set forth in claim 12, including a plurality of brace members, each having one end rigidly fastened to said platform means and another end rigidly fastened to said stiffening member.

14. Apparatus as set forth in claim 11, wherein said means
i) comprises a pair of arms rigidly mounted on said support member and trunnion means connected to said housing means and rotatably mounted in said arms, and said means (j) comprises at least one lever arm having one end rigidly and rotatably connected to one end of a hydraulic piston and cylinder assembly, the other end of said hydraulic cylinder assembly being rigidly and rotatably connected to said support column, and an elongated aperture defined by said platform means through which said hydraulic assembly extends.

15. Apparatus as set forth in claim 11, wherein said table is circular, said aperture extends through the geometric center of said table, said table member having an outer threaded surface, and said first drive means comprises gear means engaging said threaded surface for rotation through about 360°.

16. In an apparatus as set forth in claim 10, each of said means (d), (f), (g), (j) and (m) being operable in a precisely controllable manner, whereby precise positioning of said workpiece with respect to up to two linear directions of movement and three angular directions of movement can be achieved on a substantially continuous basis for accurately moving and positioning a large workpiece for machining.

17. In an apparatus as set forth in claim 12, said tracks being mounted on a rigid foundation defining a deep aperture extending along the length of said tracks to accommodate said guide member.

* * * * *